United States Patent
Jung

(10) Patent No.: US 10,048,565 B2
(45) Date of Patent: Aug. 14, 2018

(54) OPTICAL MODULATION DEVICE AND DRIVING METHOD THEREOF

(71) Applicant: SAMSUNG DISPLAY CO., LTD., Yongin-Si, Gyeonggi-Do (KR)

(72) Inventor: Kyung Ho Jung, Seongnam-Si (KR)

(73) Assignee: SAMSUNG DISPLAY CO., LTD., Yongin-si, Gyeonggi-Do (KR)

(*) Notice: Subject to any disclaimer, the term of this patent is extended or adjusted under 35 U.S.C. 154(b) by 107 days.

(21) Appl. No.: 14/996,047

(22) Filed: Jan. 14, 2016

(65) Prior Publication Data
US 2016/0246083 A1    Aug. 25, 2016

(30) Foreign Application Priority Data
Feb. 24, 2015 (KR) .................. 10-2015-0026022

(51) Int. Cl.
*G02F 1/29* (2006.01)
*G02F 1/1343* (2006.01)
*G02B 27/22* (2018.01)

(52) U.S. Cl.
CPC ........... *G02F 1/29* (2013.01); *G02B 27/2214* (2013.01); *G02F 1/134309* (2013.01)

(58) Field of Classification Search
CPC .. G02F 1/29; G02F 1/134309; G02B 27/2214
See application file for complete search history.

(56) References Cited

U.S. PATENT DOCUMENTS

| | | | |
|---|---|---|---|
| 2002/0085132 A1* | 7/2002 | Choi | G02F 1/1341 349/21 |
| 2009/0073331 A1 | 3/2009 | Shi et al. | |

FOREIGN PATENT DOCUMENTS

| | | |
|---|---|---|
| KR | 1020090006473 | 1/2009 |
| KR | 1020090065934 | 6/2009 |
| KR | 1020130112537 | 10/2013 |
| KR | 1020130116694 | 10/2013 |

OTHER PUBLICATIONS

Lei Shi, et al., "Liquid Crystal Optical Phase Plate With a Variable in-Plane Gradient," Journal of Applied Physics 104, 033109 (2008), pp. 033109-1 to 033109-7.

* cited by examiner

*Primary Examiner* — Anne Hines
(74) *Attorney, Agent, or Firm* — F. Chau & Associates, LLC

(57) ABSTRACT

An optical modulation device includes: a first substrate and a second substrate that face each other; and a liquid crystal layer provided between the first substrate and the second substrate that includes a plurality of liquid crystal molecules. The first substrate includes a plurality of unit regions, a common electrode and a first aligner, and the second substrate includes a plurality of unit regions, a plurality of upper-plate electrodes that include a plurality of first electrodes extending in a first direction and a plurality of second electrodes extending in a second direction crossing the first direction, and a second aligner.

12 Claims, 23 Drawing Sheets

OPTICAL MODULATION DEVICE AND DRIVING METHOD THEREOF

CROSS-REFERENCE TO RELATED APPLICATION

This application claims priority from Korean Patent Application No. 10-2015-0026022 filed in the Korean Intellectual Property Office on Feb. 24, 2015, and all the benefits accruing therefrom, the contents of which are herein incorporated by reference in their entirety.

BACKGROUND (a) Technical Field

Embodiments of the present disclosure are directed to an optical modulation device and a driving method thereof. More particularly, embodiments of the present disclosure are directed to an optical modulation device that includes a liquid crystal, a driving method thereof, and an optical device using the same.

(b) Discussion of the Related Art

Recently, optical devices that use an optical modulation device for modulating an optical characteristic have been developed. For example, optical display devices for displaying 3D images have garnered much attention, and they require an optical modulation device for separating images and transmitting the same at different times so that a viewer may perceive them as stereoscopic images. An optical modulation device may be used for a stereoscopic image display device without the need of viewing equipment, and includes a lens and a prism for changing the light path of an image from a display device, and transmitting it at a desired time.

Light diffraction by phase modulation can be used to change a direction of incident light.

When polarized light passes through an optical modulation device, such as a phase delay unit, its polarized state is changed. For example, when circularly polarized light is input to a half-wave plate, the rotation direction of the circularly polarized light is reversed, and the light is output. When left circularly polarized light passes through a half-wave plate, right circularly polarized light is output. In this case, the phase of the circularly polarized output light differs depending on an optical axis of the half-wave plate, that is, an angle of a slow axis. Specifically, when an optical axis of the half-wave plate rotates in-plane by $\varphi$, a phase of the output light changes by $2\varphi$. Therefore, if the optical axis of the half-wave plate rotates by 180 degrees ($\pi$ radians) in a spatial, x-axis direction, and phase modulated light can be output with a phase change of 360 degrees ($2\pi$ radians) in the x-axis direction. When an optical modulation device changes the light phase from 0 to $2\pi$ according to position, a diffraction lattice or prism for changing or redirecting the direction of the passed light can be realized.

Liquid crystals can be used to control the optical axis of an optical modulation device, such as a half-wave plate, according to the position. Regarding an optical modulation device realized as a phase delay unit using liquid crystals, different phase modulations can be achieved as a function of position by rotating a long axis of the liquid crystal molecules by applying an electric field to a liquid crystal layer. The phase of light that propagates through and out of the optical modulation device can be determined by the direction of the liquid crystal molecules, that is, an azimuthal angle.

To perform consecutive phase modulations with an optical modulation device that uses liquid crystal to realize a prism, a diffraction lattice, or a lens, the liquid crystal molecules are arranged so that the long axis of the liquid crystal molecules may consecutively changed as a function of position. For the output light to have a phase profile that changes from 0 to $2\pi$ by position, the optical axis of the half-wave plate changes from 0 to $\pi$. For this purpose, a substrate that is adjacent to the liquid crystal layer may be aligned in different directions, which can complicate the process. When a precise alignment is needed, it may be challenging to achieve with a typical process, such as a rubbing process, which may cause display defects when used in the display device.

SUMMARY

Embodiments of the present disclosure can provide an optical modulation device that includes a liquid crystal for modulating an optical phase by controlling an in-plane rotation angle of liquid crystal molecules without alignment process defects and forming various light diffraction angles by controlling a rotation direction of the liquid crystal molecules.

Embodiments of the present disclosure can simplify a process for manufacturing an optical modulation device that includes liquid crystals, reduce a production time, and removing defects caused by pretilt dispersion of liquid crystal molecules.

Embodiments of the present disclosure can increase a control of liquid crystal molecules to control texture and increase diffraction efficiency.

Embodiments of the present disclosure can manufacture a wide optical modulation device that includes liquid crystals, and have it function as a lens, a diffraction lattice, or a prism to be used for various optical devices, such as a stereoscopic image display device.

An exemplary embodiment provides an optical modulation device including: a first substrate and a second substrate that face each other; and a liquid crystal layer provided between the first substrate and the second substrate and that includes a plurality of liquid crystal molecules. The first substrate includes a plurality of unit regions, a common electrode and a first aligner, and the second substrate includes a plurality of unit regions, a plurality of upper-plate electrodes that include a plurality of first electrodes extending in a first direction, a plurality of second electrodes extending in a second direction crossing the first direction, and a second aligner.

The plurality of liquid crystal molecules are substantially perpendicular to a surface direction of the common electrode or the upper-plate electrode.

When the optical modulation device is turned on, a voltage may be applied to the common electrode and the second electrodes.

After the voltage is applied to the common electrode and the second electrodes, a voltage may be sequentially applied to the first electrodes in a direction in which the first electrodes are arranged.

An increasing voltage may be applied to the first electrodes and the second electrodes.

When the voltage is applied to the common electrode and the upper-plate electrode, the liquid crystal molecules may rotate by 180 degrees in the first direction between two second electrodes of two neighboring unit regions.

The unit region may form one of a forward phase slope or a backward phase slope.

Gaps between the second electrodes may differ and correspond to an inclination of the phase slope of the corresponding unit region.

A polarity of the voltage applied to the common electrode may differ from a polarity of the voltage applied to the upper-plate electrode.

The optical modulation device may further include a display panel that includes a polarizer for linearly polarizing light of an image displayed to the display panel; and a phase retardation plate disposed on the display panel, wherein the optical modulation device is disposed on the phase retardation plate.

Another embodiment provides a method for driving an optical modulation device, including: applying a common voltage to a common electrode on a first substrate; and applying a voltage with a polarity that differs from that of the common voltage to a plurality of upper-plate electrodes on a second substrate facing the first substrate, wherein the upper-plate electrodes include a plurality of first electrodes extending in a first direction i and a plurality of second electrodes extending in a second direction crossing the first direction.

Applying a voltage to a plurality of upper-plate electrodes may include applying a voltage to the plurality of second electrodes, and applying a voltage to the plurality of first electrodes.

Applying a voltage to a plurality of first electrodes may include sequentially applying a voltage to the first electrodes in a direction in which the first electrodes are arranged.

Applying a voltage to a plurality of second electrodes may include applying an increasing voltage to the second electrodes.

Applying of voltage to a plurality of first electrodes may include applying an increasing voltage to the respective first electrodes.

The voltage applied to the second electrodes may change in a stepwise manner.

The voltage applied to the respective first electrodes may change in a stepwise manner.

Yet another embodiment provides an optical modulation device including: a first substrate that includes a common electrode; a second substrate that includes a plurality of unit regions and a plurality of upper-plate electrodes; and a liquid crystal layer disposed between the first substrate and the second substrate that includes a plurality of liquid crystal molecules, wherein the plurality of upper-plate electrodes includes a plurality of first electrodes extending in a first direction and a plurality of second electrodes extending in a second direction crossing the first direction, and when a voltage is applied to the common electrode and the upper-plate electrodes, the liquid crystal molecules rotate 180 degrees in the first direction between two second electrodes of two neighboring unit regions The first substrate may further include a first aligner and the second substrate may further include a second aligner, and the plurality of liquid crystal molecules are initially substantially perpendicular to a surface direction of the common electrode or the upper-plate electrodes.

When the optical modulation device is turned on, a voltage may be applied to the common electrode and the second electrodes, a voltage may be sequentially applied to the first electrodes in a direction in which the first electrodes are arranged, wherein the voltage applied to the first electrodes and the second electrodes increases stepwise.

According to the exemplary embodiments, an optical modulation device that includes liquid crystals may modulate an optical phase by controlling an in-plane rotation angle of liquid crystal molecules without defects caused by an alignment process and may form various light diffraction angles by controlling a rotation direction of the liquid crystal molecules A process for manufacturing an optical modulation device that includes liquid crystals may be simplified, the production time may be reduced, and defects caused by a pretilt dispersion of liquid crystal molecules may be substantially eliminated.

The liquid crystal molecules may be better controlled to control texture and increase diffraction efficiency.

Further, an optical modulation device that includes liquid crystals can be manufactured to be wide, may function as a lens, a diffraction lattice, or a prism to be used for various kinds of optical devices, such as a stereoscopic image display device.

Additional applications will become clear from the following detailed description. However, since various modifications and alternates within the spirit and scope of the present disclosure may be clearly understood by those skilled in the art, it is to be understood that a detailed description and a specific exemplary embodiment of the present disclosure such as an exemplary embodiment of the present disclosure are provided only by way of example.

DETAILED DESCRIPTION OF EXEMPLARY EMBODIMENTS

Figure 1:
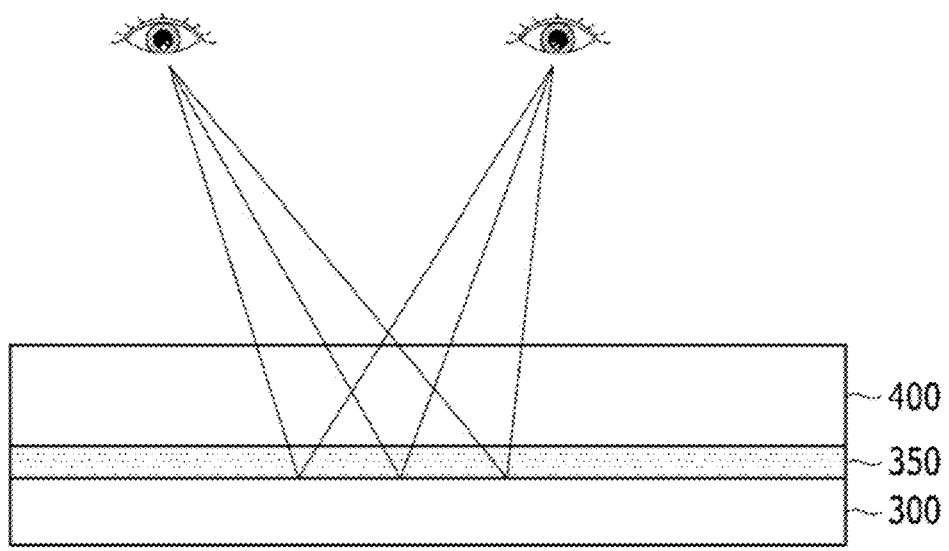
FIG. 1 is a schematic view of an optical device and a method for forming a two-dimensional (2D) image according to an exemplary embodiment.

Hereinafter, exemplary embodiments disclosed in the present specification will be described in detail with reference to the accompanying drawings. In the present specification, the same or similar components may be denoted by the same or similar reference numerals, and an repeated description thereof will be omitted.

It is to be understood that when one component is referred to as being "connected" or "coupled" to another component, it may be connected or coupled directly to the other component or be connected or coupled to the other component with another component intervening therebetween.

Figure 2:
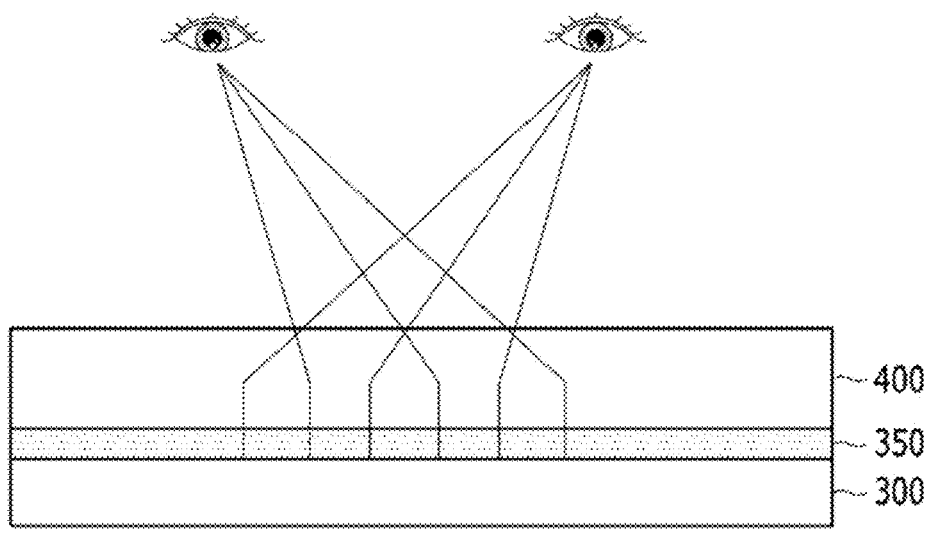
FIG. 2 is a schematic view of an optical device and a method for forming a three-dimensional (3D) image according to an exemplary embodiment.

FIG. 1 is a schematic view of an optical device and a method for forming a two-dimensional (2D) image according to an exemplary embodiment. FIG. 2 is a schematic view of an optical device and a method for forming a three-dimensional (3D) image according to an exemplary embodiment.

Referring to FIGS. 1 and 2, the optical device includes a display panel 300, a phase retardation plate 350, and an optical modulation device 400 as a stereoscopic image display device.

The optical device includes a display panel 300 for displaying an image and the optical modulation device 400 is provided on a side of the display panel 300 on which the image is displayed. The display panel 300 and the optical modulation device 400 may be operable in a 2D image displaying mode or a 3D image displaying mode.

The display panel 300 displays an image, and it may be one of various optical devices, such as a plasma display panel (PDP), a liquid crystal display, or an organic light emitting display.

The display panel 300 includes a plurality of signal lines and a plurality of pixels connected thereto. A plurality of pixels may be substantially arranged in a matrix format. Each pixel may include a switching element such as a thin film transistor connected to a signal line and a pixel electrode connected thereto. The signal lines may include a plurality of gate lines, each of which delivers a gate signal, also referred to as a scanning signal or a scan signal, corresponding to each pixel, and a plurality of data lines, each of which delivers a data signal corresponding to each pixel. A pixel may uniquely display one of the primary colors in a spatial division mode, or a plurality of pixels may alternately display each primary color over time, in a temporal division mode, and a spatial sum or a temporal sum of the primary colors may be displayed as a desired color on the display panel 300.

The display panel 300 displays a plane image when operable in 2D image displaying mode. The display panel 300 may display images corresponding to various viewable sections, such as a right-eye image or a left-eye image, according to a spatial division scheme or a temporal division scheme, when being operated in 3D image displaying mode. For example, in 3D image displaying mode, the display panel 300 may alternately display the right-eye image and the left-eye image for pixels of one column.

The display panel 300 may include a plurality of electrical elements for displaying images, for example, an active substrate that includes a plurality of signal lines and a plurality of pixels connected thereto, and a polarizer attached to the active substrate. The polarizer linearly polarizes incident light in a direction parallel to a transmission axis. The linear polarization direction of the polarizer may be the x-axis direction or the y-axis direction, but embodiments are not restricted thereto. The polarizer may be provided between the active substrate and a phase retardation plate 350, but embodiments are not restricted thereto.

The phase retardation plate 350 may be provided on a side of the display panel 300 for displaying an image and may be a film. The phase retardation plate 350 may be a quarter-wave plate that provides a ¼-wavelength phase retardation to the transmitted light. The light output by the display panel 300 is linearly polarized and becomes circularly polarized when passing through the phase retardation plate 350.

The optical modulation device 400 transmits light of the display panel 300 as is when the display panel 300 is operated in 2D image displaying mode. The light of the display panel 300 output from the optical modulation device 400 is perceived by the user as a 2D image.

The optical modulation device 400 diffracts and refracts the light from the display panel 300 when the display panel 300 is operated in 3D image displaying mode. The optical modulation device 400 diffracts and refracts the light from the display panel 300 so that images may be transmitted to the corresponding viewable sections at different the respective times. The light of the display panel 300 output from the optical modulation device 400 is perceived by the user as a 3D image.

FIG. 1 shows a case when the display panel 300 and the optical modulation device 400 are operable in 2D image displaying mode. The same image is received by the right eye and the left eye of the user so that the user perceives the image displayed on the display panel 300 as a 2D image.

FIG. 2 shows a case when the display panel 300 and the optical modulation device 400 are operable in 3D image displaying mode. The optical modulation device 400 divides the light of the display panel 300 into light of the right-eye viewable section and light of the left-eye viewable section and refracts the same so that the user's right eye receives a right-eye image and the user's left eye receives a left-eye image. Accordingly, the user perceives the image displayed on the display panel 300 as a 3D image.

The display panel 300 may display a 2D image in 2D image displaying mode, and it may divide the images corresponding to different times by spatial division or temporal division and may alternately display the same in 3D image displaying mode.

For example, in 3D mode, some of a plurality of pixels may display an image corresponding to one instant of time, while other pixels may display an image corresponding to another instant of time. There may be a plurality of instances of times.

Figure 3:
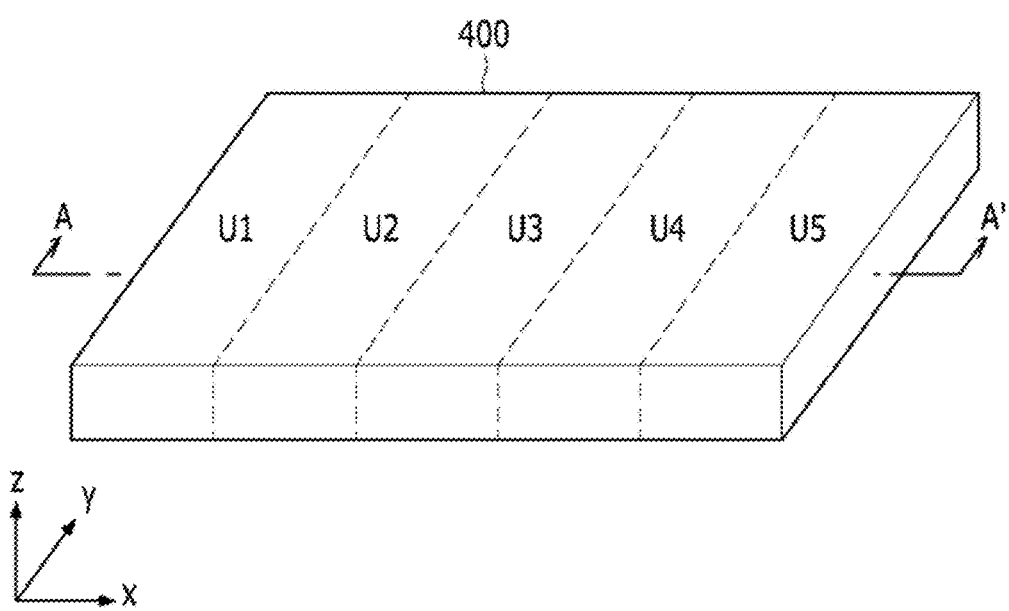
FIG. 3 is a perspective view of an optical modulation device included in an optical device according to an exemplary embodiment.
Figure 4:
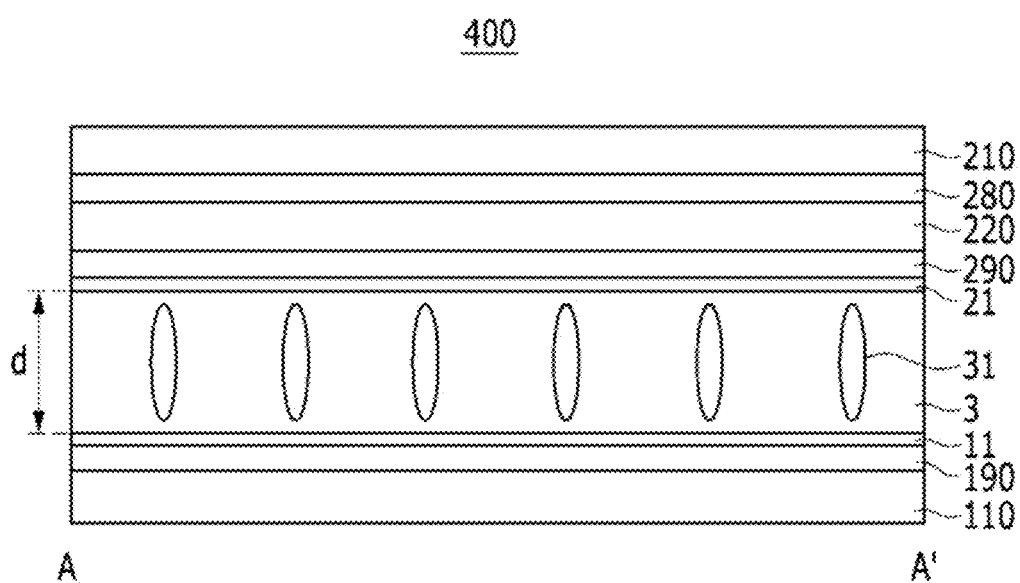
FIG. 4 is a cross-sectional view of an optical modulation device with respect to a line A-A' of FIG. 3.
Figure 5:
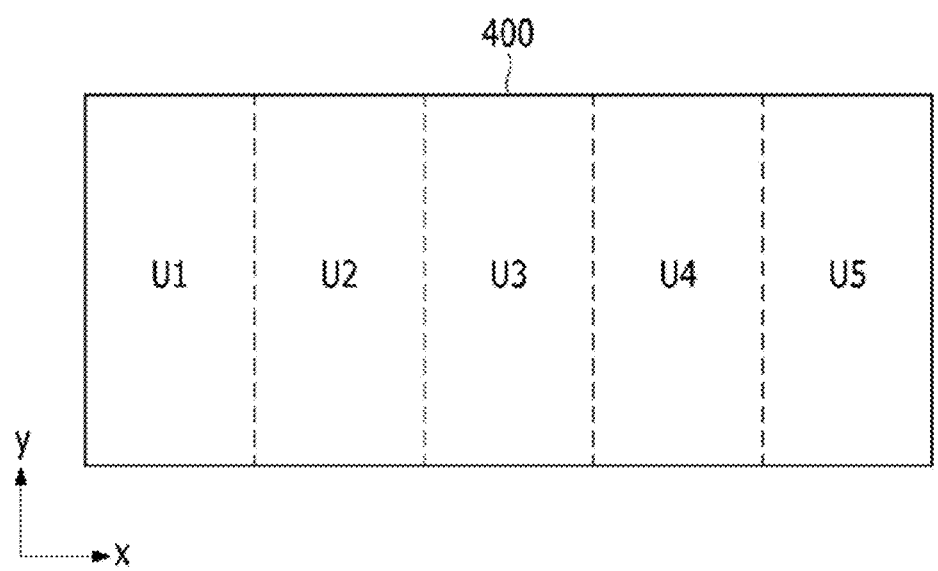
FIG. 5 is a top plan view of an example of an optical modulation device of FIG. 3 on an xy plane.

FIG. 3 is a perspective view of an optical modulation device 400 included in an optical device according to an exemplary embodiment, and FIG. 4 is a cross-sectional view of an optical modulation device 400 with respect to a line A-A' of FIG. 3. FIG. 5 is a top plan view of an example of an optical modulation device 400 of FIG. 3 on an xy plane.

Referring to FIG. 3 to FIG. 5, the optical modulation device 400 includes a plurality of unit elements labeled U1-U5 sequentially provided in the x-axis direction. A single unit element corresponds to N pixels of the display panel 300, where N is a natural number. One unit element may function as one lens.

The optical modulation device 400 includes a first substrate 110 and a second substrate 210 that face each other, each made of an insulating material such as glass or plastic, and a liquid crystal layer 3 provided between the substrates 110 and 210. A common electrode layer 190 and a first alignment layer 11 are sequentially disposed on an upper portion of the first substrate 110. A first electrode layer 280, an insulating layer 220, a second electrode layer 290, and a second alignment layer 21 are sequentially disposed on a lower portion of the second substrate 210.

The common electrode layer 190, the first electrode layer 280, and the second electrode layer 290 may be formed from a transparent conductive material such as indium tin oxide (ITO) or indium zinc oxide (IZO). The common electrode layer 190 may be formed as a single plate-shaped electrode without any additional patterns. The first electrode layer 280 and the second electrode layer 290 may be patterned and formed with a plurality of linear electrodes. The plurality of linear electrodes of the first electrode layer 280 and the plurality of linear electrodes of the second electrode layer 290 will be described below with reference to FIG. 9 and FIG. 10.

The liquid crystal layer 3 includes a plurality of liquid crystal molecules 31. The liquid crystal molecules 31 have negative dielectric anisotropy, and arranged in a direction transverse with respect to a direction of an electric field generated in the liquid crystal layer 3.

The liquid crystal molecules 31 are aligned substantially perpendicular with respect to the first and second substrates 110 and 210 when no electric field is generated in the liquid crystal layer 3. The liquid crystal molecules 31 may be nematic liquid crystal molecules 31.

A height (d) of a cell gap of the liquid crystal layer 3 can substantially satisfy Equation 1 for light for a specific wavelength (λ). Accordingly, the optical modulation device 400 according to an exemplary embodiment can function as a half-wave plate, and is usable as a diffraction lattice or a lens.

$$\frac{\lambda}{2} \times 1.3 \geq \Delta nd \geq \frac{\lambda}{2} \qquad \text{(Equation 1)}$$

Here, Δnd is a phase retardation value of light passing through the liquid crystal layer 3, where n is related to the refractive index and d is the cell gap.

A first aligner 11 may be provided on an internal side of the common electrode layer 190, and a second aligner 21 may be provided on an internal side of the second electrode layer 290.

The first aligner 11 and the second aligner 21 may be vertical alignment layers, and are not aligned in any specific direction. Therefore, an alignment process, such as a rubbing process, may be omitted from a process for manufacturing an optical modulation device 400 according to an exemplary embodiment, which may simplify the manufacturing process, reduce a production time, and prevent defects caused by a pretilt dispersion of the liquid crystal molecules 31. Further, defects due to bad alignment will not generated in the optical modulation device 400 or an optical device including the same, thus making it easier to manufacture a larger optical modulation device 400.

FIG. 5 shows a border between the unit elements (U1-U5) of the optical modulation device 400 as being parallel to the y axis, however, embodiments are not limited thereto.

Figure 6:
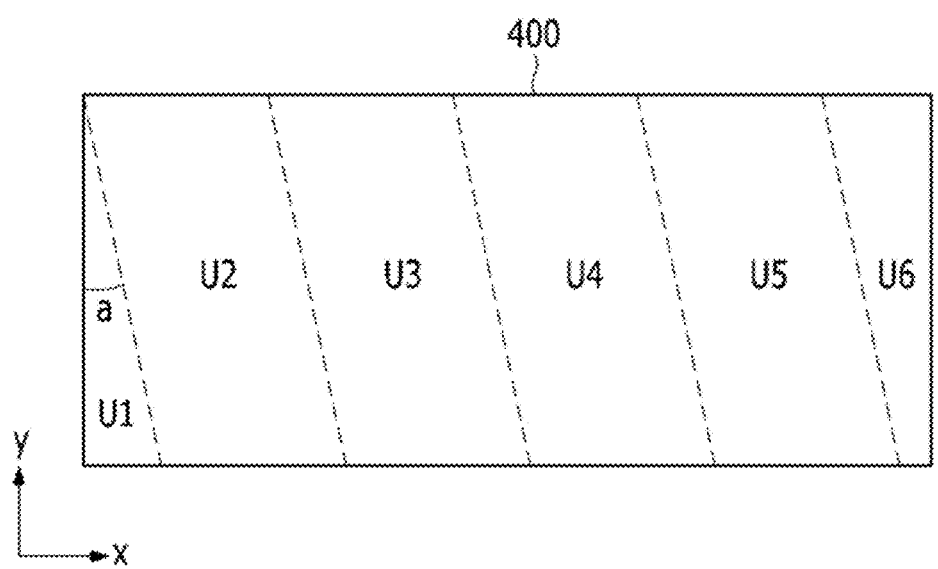
FIG. 6 is a top plan view of another example of an optical modulation device of FIG. 3 on an xy plane.

FIG. 6 is a top plan view of another example of an optical modulation device 400 of FIG. 3 on an xy plane. Referring to FIG. 6, the optical modulation device 400 includes a plurality of unit elements (U1-U6), and the border between the unit elements (U1-U6) is inclined by an angle a with respect to the y axis. For example, the angle a may be an angle between about 1 and about 30 degrees.

For clarity of exposition, as shown in FIG. 5, the border between the unit elements (U1-U5) of the optical modulation device 400 will be assumed to be parallel to the y axis.

Referring to FIG. 4, an electric field is formed in the liquid crystal layer 3 by applying a voltage to the common electrode layer 190, the first electrode layer 280, and the second electrode layer 290, which changes an arrangement of the liquid crystal molecules 31 of the liquid crystal layer 3.

Alignment layers 11 and 21 determine an initial alignment of the liquid crystal molecules 31 of the liquid crystal layer 3. The liquid crystal layer 3 may be aligned in a vertical alignment (VA) mode. In a VA mode, the alignment layers 11 and 21 are vertical alignment layers, the liquid crystal molecules 31 are vertically aligned with respect to the alignment layers 11 and 21, so that the liquid crystal molecules 31 inside the liquid crystal layer 3 are aligned normal to the substrate 110 and 210.

The optical modulation device 400 may be operated in 2D image display mode or 3D image display mode according to the voltage applied to the common electrode layer 190, the first electrode layer 280, and the second electrode layer 290. When no voltage is applied to the common electrode layer 190, the first electrode layer 280, and the second electrode layer 290, the optical modulation device 400 operates in 2D image displaying mode.

When a voltage is applied to the common electrode layer 190, the first electrode layer 280, and the second electrode layer 290, the optical modulation device 400 may operate in 3D image displaying mode. For this purpose, the initial alignment direction of the liquid crystal molecules 31 should be appropriately controlled.

When the optical modulation device 400 operates in 3D image display mode, the respective unit elements (U1-U5) of the optical modulation device 400 function as a single lens. The liquid crystal molecules 31 may be initially aligned so that the respective unit elements (U1-U5) may function as a lens.

Now will be described the principles for the optical modulation device 400 to operate in 3D image display mode as a gradient index (GRIN) lens or a Fresnel zone plate.

Figure 7:
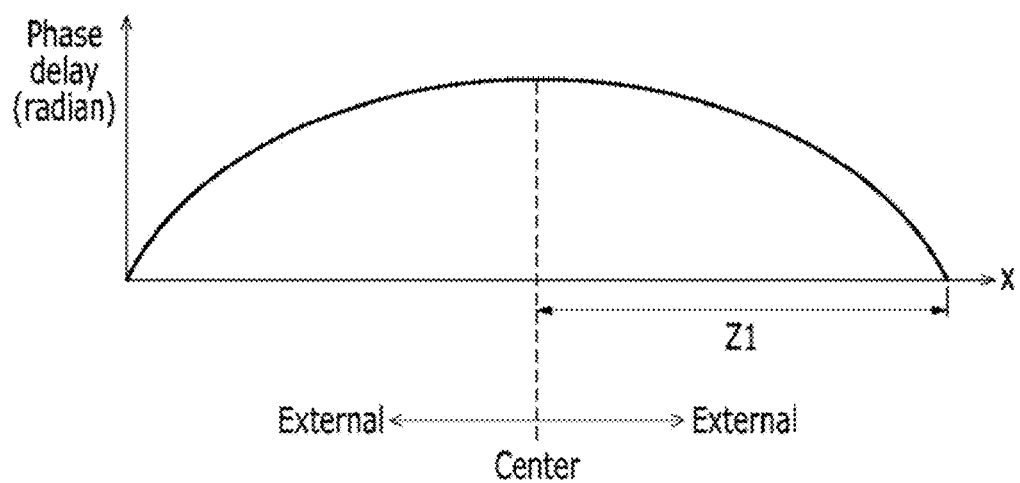
FIG. 7 shows an example of a phase retardation of a unit element as a function of position.
Figure 8:
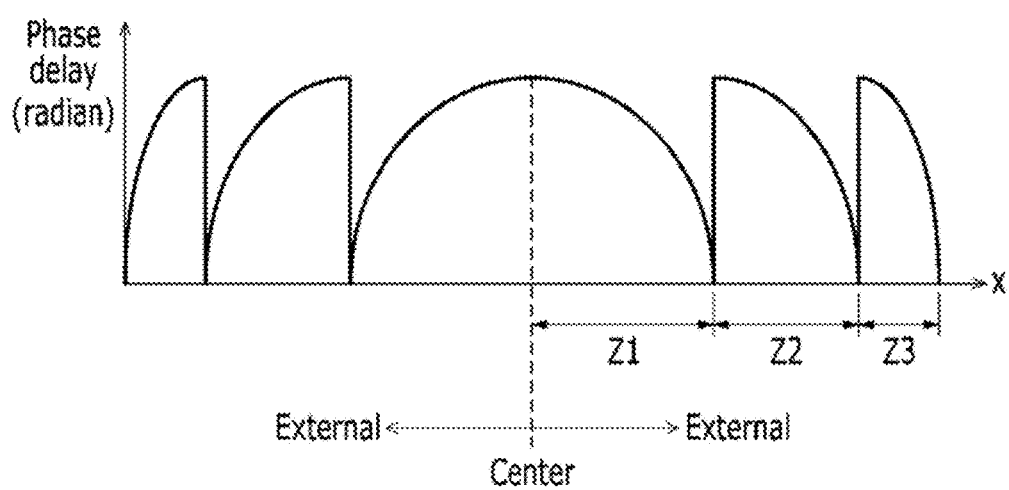
FIG. 8 shows another example of a phase retardation of a unit element as a function of position.

FIG. 7 shows an example of a phase retardation of a unit element as a function of position and FIG. 8 shows another example of a phase retardation of a unit element as a function of position. FIG. 7 shows a unit element operating as a GRIN lens, and FIG. 8 shows a unit element operating as a Fresnel zone plate.

A Fresnel zone plate is a device serving as a lens using light diffraction rather than light refraction by using a plurality of concentric annuli, radially arranged as in a Fresnel zone, and whose widths become narrower with increasing distance from a center thereof.

Referring to FIG. 7 and FIG. 8, the unit element includes at least one zone. The zones of the unit elements of FIG. 7 and FIG. 8 are symmetric with respect to the center. FIG. 7 shows the case in which there is a single zone Z1 extending from the center of the unit element to the outer part. FIG. 8 shows the case in which there is a plurality of zones Z1 to Z3 provided between the center of the unit element and the outer part thereof. In FIG. 8, widths of the zones Z1 to Z3 of the unit element become narrower with increasing distance from the center. FIG. 8 illustrates a case in which three zones Z1 to Z3 are provided between the center and the outer part.

In FIG. 7, the phase retardation of the zone Z1 of the unit element decreases from the center toward the outer part. In FIG. 8, phase retardations of the zones Z1 to Z3 of the unit element decrease with increasing distance from the center toward the outer part. The phase retardations of the unit elements in FIG. 7 and FIG. 8 may be symmetric with respect to the center.

By forming a phase retardation distribution shown in FIG. 7 or FIG. 8, the unit elements may refract light to be focused at a point through diffraction, destructive interference, and constructive interference. As such, a unit element can function as a lens by operating as a GRIN lens or a Fresnel zone plate.

The optical modulation device 400 in which the unit element operates as a Fresnel zone plate will now be described with reference to FIG. 9 to FIG. 20. The optical modulation device 400 may also be referred to as a switchable zone plate.

Figure 9:
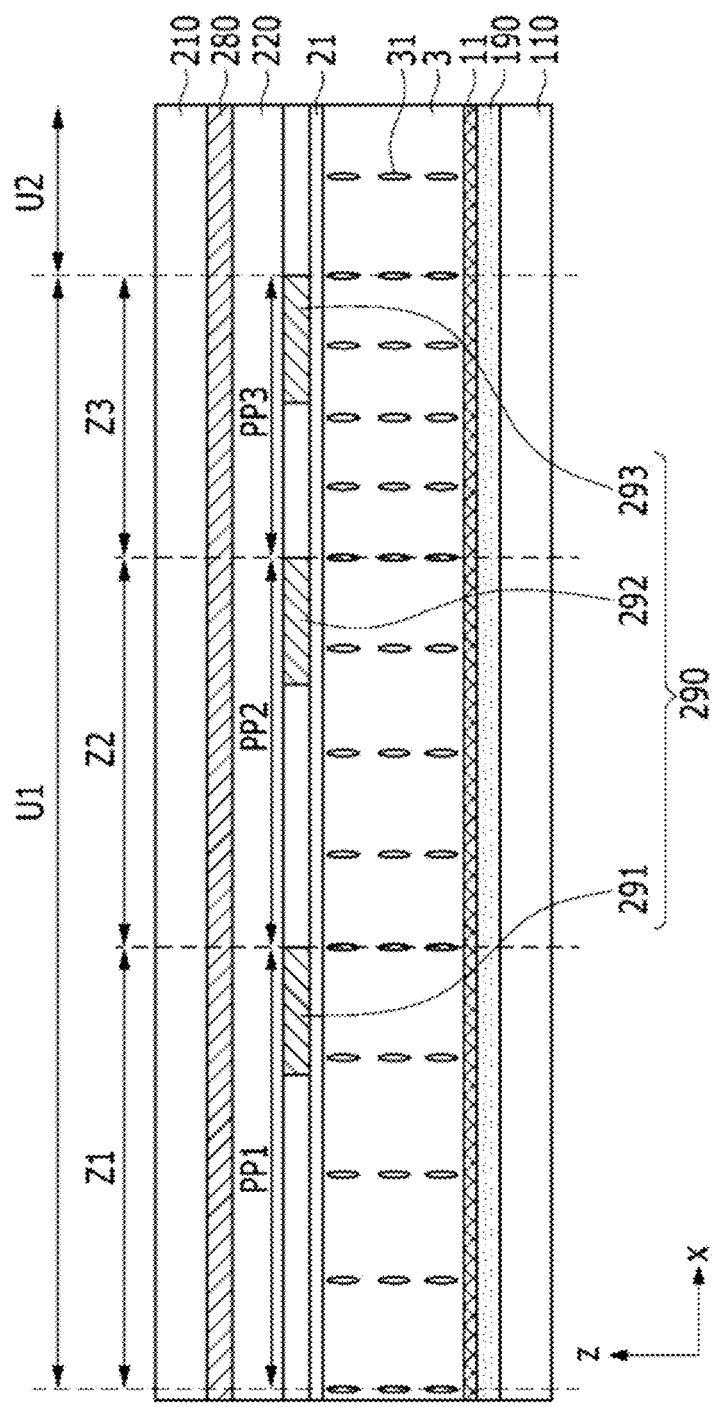
FIG. 9 is a cross-sectional view of an xz plane of part of an optical modulation device configured for a unit element of a Fresnel zone plate, according to an exemplary embodiment.
Figure 10:
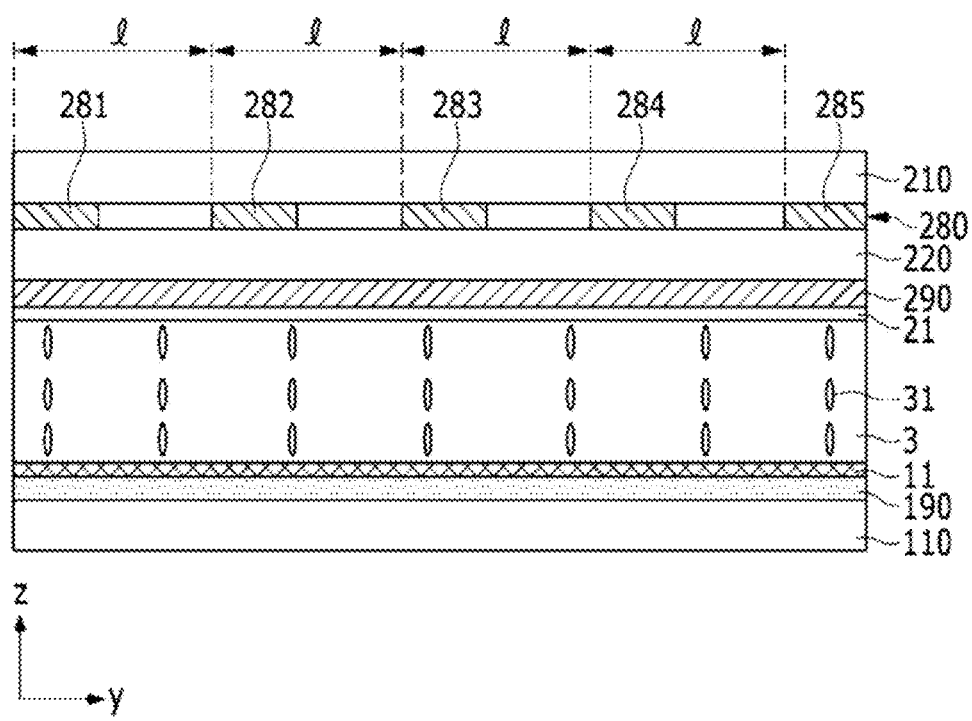
FIG. 10 is a cross-sectional view of a yz plane of part of an optical modulation device configured for a unit element of a Fresnel zone plate, according to an exemplary embodiment.

FIG. 9 is a cross-sectional view of an xz plane of part of an optical modulation device 400 configured for an element of a Fresnel zone plate according to an exemplary embodiment and FIG. 10 is a cross-sectional view of a yz plane of part of an optical modulation device 400 configured for an element of a Fresnel zone plate according to an exemplary embodiment.

Referring to FIG. 9, the unit element U1 of the optical modulation device 400 includes a first zone Z1, a second zone Z2, and a third zone Z3. The first zone Z1, the second zone Z2, and the third zone Z3 included in the unit element U1 will be described with reference to FIG. 9. The common electrode layer 190 disposed on the first substrate 110 functions as an electrode. A reference voltage such as a common voltage is applied to the common electrode layer 190.

A liquid crystal layer 3 is disposed on an upper portion of the common electrode layer 190, and a second electrode layer 290 is disposed on an upper portion of the liquid crystal layer 3. The second electrode layer 290 includes a plurality of second linear electrodes 291, 292, and 293. The second linear electrodes 291, 292, and 293 may extend in a direction parallel to the y axis. The second linear electrodes 291, 292, and 293 may have the same width.

Gaps between the second linear electrodes 291, 292, and 293 in the unit element may have different widths. For example, a second linear electrode 291 in the first zone Z1 and a second linear electrode 292 of the second zone Z2 are separated by a first gap. The second linear electrode 292 of the second zone Z2 and a second linear electrode 293 of the third zone Z3 are separated by a second gap. These gaps correspond to a change in phase retardation as a function of a position in the unit element.

An insulating layer 220 is disposed on the upper portion of the second electrode layer 290. The insulating layer 220 may be formed from a transparent organic insulator or a transparent inorganic insulator. The organic insulator includes a plastic material, such as polyethylene terephthalate (PET), polyethylene naphthalate (PEN), polyimide (PI), polycarbonate (PC), polymethylmethacrylate (PMMA), polyarylate (PAR), polyetherimide (PEI), polyethersulfone (PES), or cellulose triacetate (TAC), and the inorganic insulator includes a glass material or an optically processed glass material.

A first electrode layer 280 is disposed on an upper portion of the insulating layer. The first electrode layer 280 includes a plurality of first linear electrodes, and the first linear electrodes extend in a direction parallel to the x axis. A disposition of the first linear electrodes will now be described with reference to FIG. 10.

As shown in FIG. 10, the first linear electrodes (281-285) may be arranged in a direction parallel to the y axis. The first linear electrodes (281-285) may be disposed at regular intervals (l). The widths of the first linear electrodes (281-285) may be constant.

The intervals (l) between the first linear electrodes (281-285) may be less than intervals (PP1-PP3) between the second linear electrodes (291-293). The first linear electrodes (281-285) cross the second linear electrodes (291-293) on the xy plane.

An arrangement of liquid crystal molecules 31 in 2D image display mode and 3D image display mode of the optical modulation device 400 will now be described with reference to FIG. 11 and FIG. 12.

Figure 11:
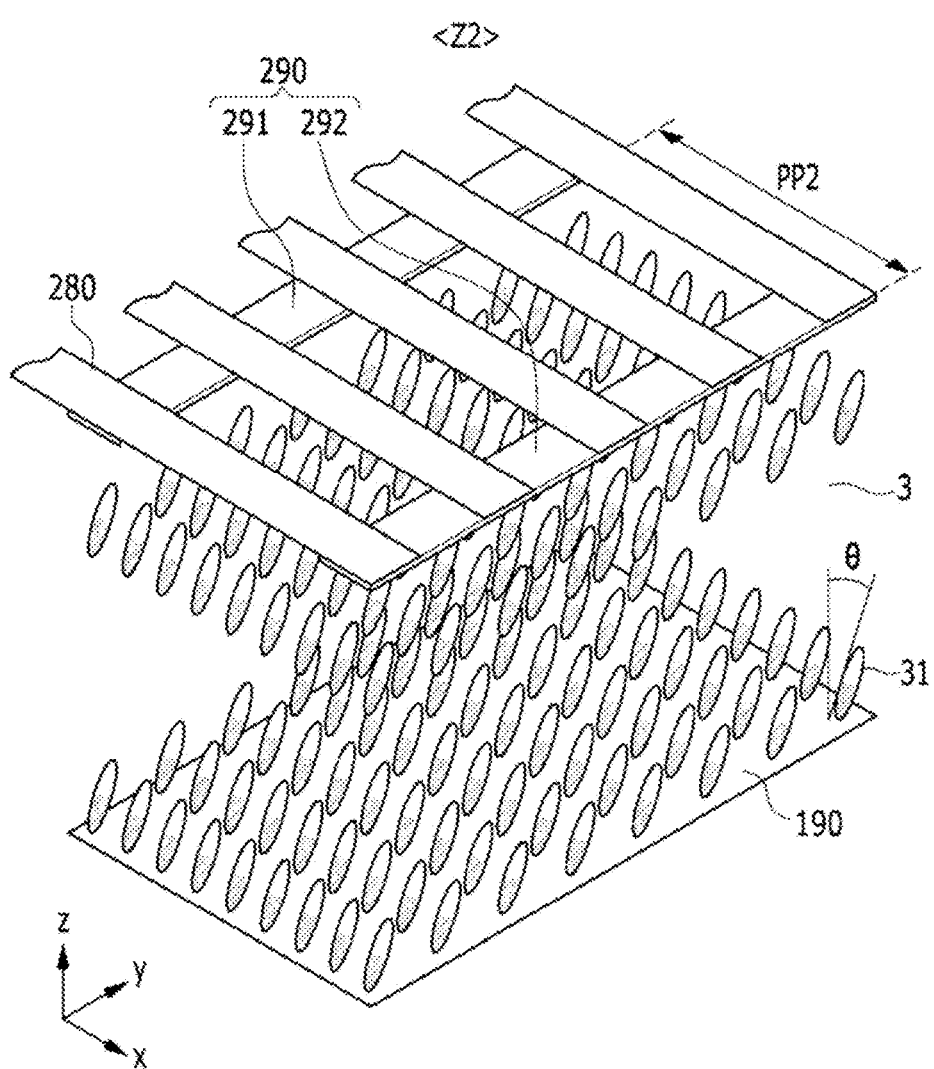
FIG. 11 is a perspective view of part of an optical modulation device configured for a unit element of a Fresnel zone plate, according to an exemplary embodiment.
Figure 12:
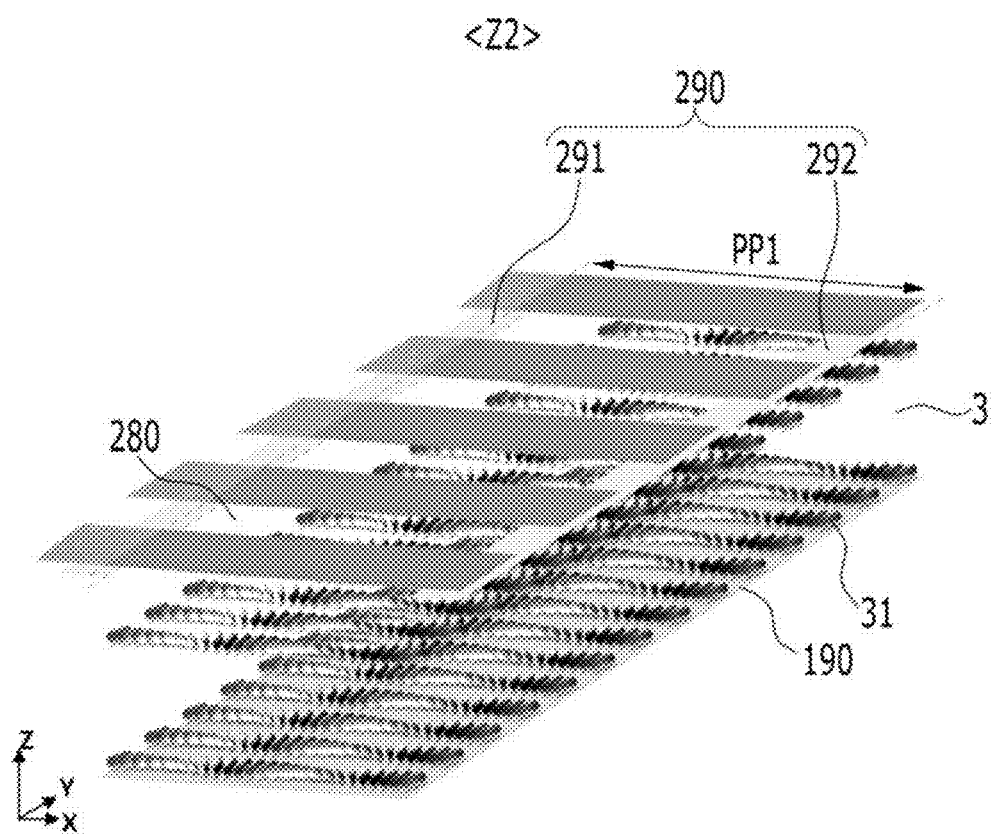
FIG. 12 is a perspective view when a voltage is applied to part of an optical modulation device of FIG. 11.

FIG. 11 is a perspective view of part of an optical modulation device 400 configured for a unit element of a Fresnel zone plate according to an exemplary embodiment, and FIG. 12 is a perspective view when a voltage is applied to part of an optical modulation device 400 of FIG. 11.

As shown in FIG. 11, when no voltage is applied to the common electrode layer 190, the first electrode layer 280, and the second electrode layer 290, the optical modulation device 400 operates in 2D image display mode.

The liquid crystal molecules 31 are aligned to be pretilted at a predetermined angle with respect to the z axis. The pretilt refers to an inclination of a director of the liquid crystal layer 3 with respect to the substrates 110 and 210. The liquid crystal molecules 31 are positioned parallel to the z axis, so that the phase retardations are essentially constant as a function of position in the optical modulation device 400. Therefore, the optical modulation device 400 does not generate phase retardation according to position, and the optical modulation device 400 operating in 2D image display mode does not function as a lens.

As shown in FIG. 12, when a voltage difference that is greater than a threshold voltage is applied to the common electrode 190, the first electrode 280, and the second electrode 290, and an electric field is generated in the liquid crystal layer 3, the liquid crystal molecules 31, which have negative dielectric anisotropy, tend to incline in a direction that is perpendicular to the direction of the electric field.

The liquid crystal molecules 31 on a surface of the first substrate 110 or the second substrate 210 mostly incline parallel to each other to form an in-plane arrangement, and a long axis of the liquid crystal molecules 31 rotates in-plane. An in-plane arrangement is characterized by the long axis of the liquid crystal molecules 31 being aligned parallel with the surface of the first substrate 110 or the second substrate 210.

An in-plane rotation angle of the liquid crystal molecules 31, that is, an azimuthal angle, may be changed by the electric field generated in the liquid crystal layer, and it may change to a spiral depending on the position of the molecules in the x-axis direction.

A method and operation for driving an optical modulation device 400 according to an exemplary embodiment will now be described with reference to FIG. 13 and FIG. 14.

Figure 13:
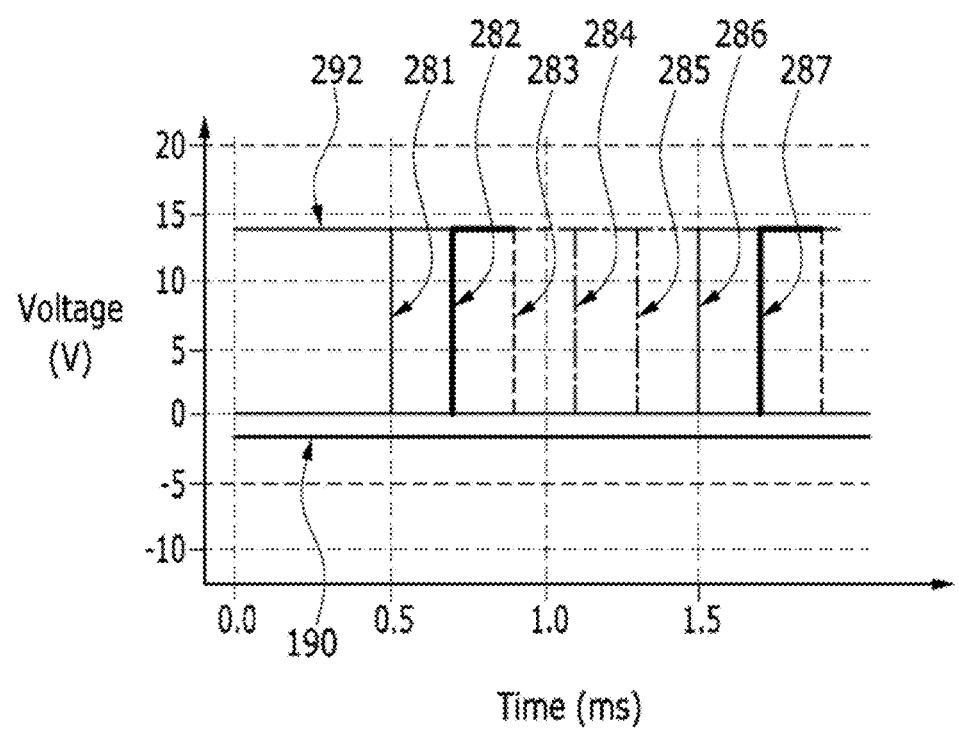
FIG. 13 shows a graph of a voltage applied to electrodes of an optical modulation device shown in FIG. 11.
Figure 14:
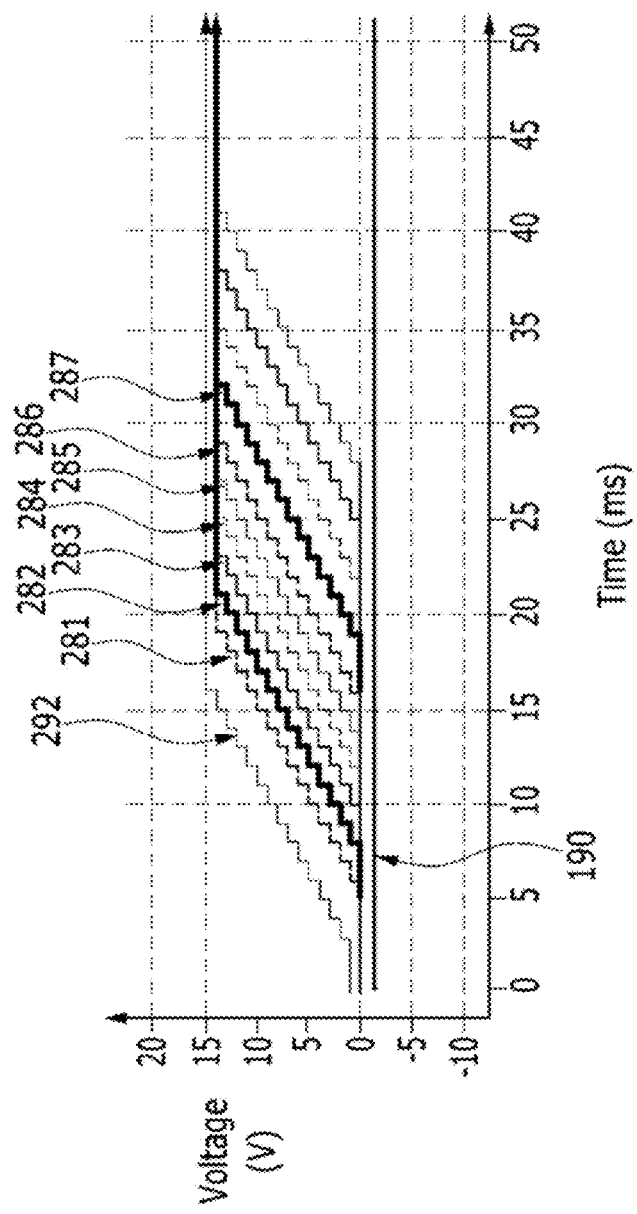
FIG. 14 shows a graph of another voltage applied to electrodes of an optical modulation device shown in FIG. 11.

FIG. 13 shows a graph of a voltage applied to electrodes in zone Z2 of an optical modulation device 400 shown in FIG. 11, and FIG. 14 shows a graph of another voltage applied to electrodes in zone Z2 of an optical modulation device 400 shown in FIG. 11. The following exemplary embodiment will be described in terms of a voltage applied to electrodes in zone Z2. Similar voltages may also be applied to the common electrode 190, the first electrode 280, and the second electrode 290 in the zones Z1 and Z3.

As shown in FIG. 13, when the optical modulation device 400 operates in 3D image display mode, a voltage is applied to the common electrode 190. The voltage applied to the common electrode 190 may be assumed to be about −0.5 volts.

A voltage is also applied to the second electrode 292. The voltage applied to the second electrode 292 may be assumed to be about 15 volts. When the voltage is applied to the second electrode 292, the liquid crystal molecules 31 near the second electrode 292 incline in the pretilt direction. The liquid crystal molecules 31 incline substantially parallel to the surface of the first substrate 110 or the second substrate 210.

A voltage may be sequentially applied to a plurality of consecutive first linear electrodes (281-287).

The voltage applied to the first linear electrodes (281-287) may be assumed to be about 14.5 volts. The voltages are sequentially applied to the first linear electrodes (281-287) so that electric fields are sequentially generated in the first linear electrode direction from the first linear electrode to which a voltage is applied toward the first linear electrodes to which no voltage is applied, and the liquid crystal molecules 31 may form a spiral arrangement, specifically, an n-shaped arrangement.

As shown in FIG. 14, when the optical modulation device 400 operates in 3D image display mode, a voltage is applied to the common electrode 190. The voltage applied to the common electrode 190 may be assumed to be about −0.5 volts.

A voltage is also applied to the second electrode 292. The voltage applied to the second electrode 292 may increase as a function of time. For example, the voltage applied to the second electrode 292 may increase in a stepwise manner. The voltage applied to the second electrode 292 may be assumed to increase to about 15 volts. When the voltage is applied to the second electrode 292, the liquid crystal molecules 31 near the second electrode 292 incline in the pretilt direction. The liquid crystal molecules 31 incline substantially parallel to the surface of the first substrate 110 or the second substrate 210.

A voltage may be sequentially applied to a plurality of consecutive first linear electrodes (281-287).

The voltage applied to the respective first linear electrodes (281-287) may increase with respect to time. For example, the voltage applied to the first linear electrodes (281-287) may increase in a stepwise manner. The voltage applied to the first linear electrodes (281-287) may be assumed to increase to about 14.5 volts. The voltages are sequentially applied to the first linear electrodes so that electric fields are sequentially generated in the first linear electrode direction from the first linear electrode to which a voltage is applied toward the first linear electrodes to which no voltage is applied, and the liquid crystal molecules 31 may form a spiral arrangement, specifically, an n-shaped arrangement.

Although an embodiment has been described in which a gradually increasing voltage is applied to the first linear electrodes (281-287), in other embodiments, a gradually decreasing voltage may be applied to the first linear electrodes (281-287), depending on the arrangement of the liquid crystal molecules 31 or polarization of light passing through the phase retardation plate 350.

A method for driving the above-described optical modulation device 400 will now be described with reference to FIG. 15 to FIG. 19.

FIG. 15 to FIG. 19 illustrate electrodes of an optical modulation device 400 to which voltages of FIG. 11 and FIG. 12 are applied and an arrangement on an xy plane of liquid crystal molecules 31 on a liquid crystal layer.

FIG. 15 to FIG. 19 show one of the zones of a unit element of the optical modulation device 400.

Figure 15:
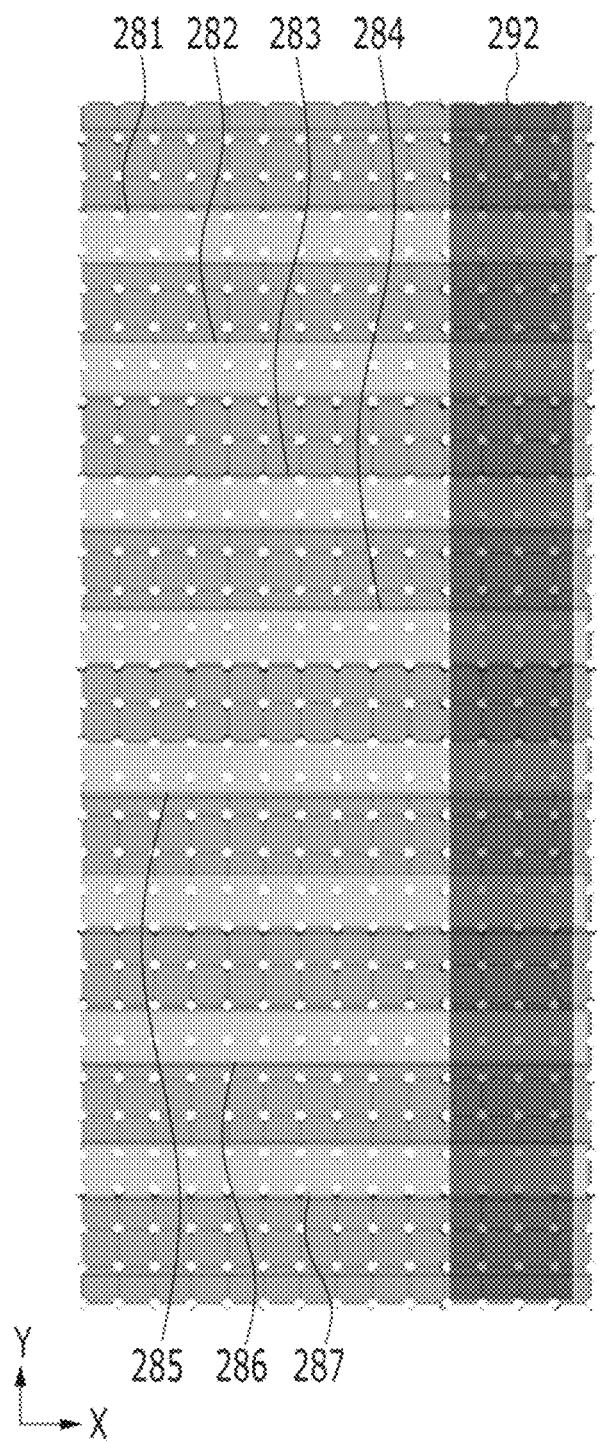
FIG. 15 to FIG. 19 illustrate electrodes of an optical modulation device to which voltages of FIG. 11 and FIG. 12 are applied, and an arrangement on an xy plane of liquid crystal molecules on a liquid crystal layer.

As shown in FIG. 15, no voltages are applied to the common electrode 190, the first electrode 280, and the second electrode 292 in 2D image display mode. The liquid crystal layer 3 is aligned in VA mode so the liquid crystal molecules 31 are aligned normal (i.e., z-axis direction) to the substrates 110 and 210. Therefore, the phase retardations are essentially constant as a function of position in the optical modulation device 400. That is, no phase retardation differences are generated according to position in the optical modulation device 400, and the optical modulation device 400 does not function as a lens but operates in 2D image display mode.

Figure 16:
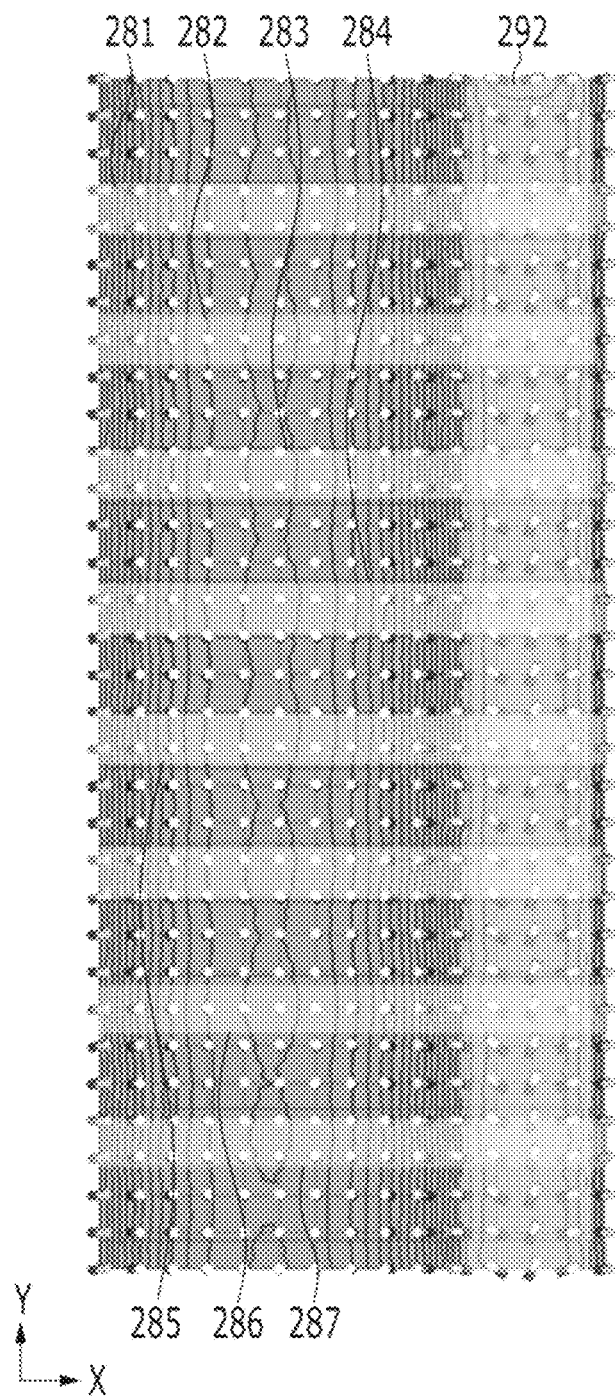

As shown in FIG. 16, when the optical modulation device 400 operates in 3D image display mode, a voltage is applied to the common electrode 190 and the second electrode 292. The voltage applied to the second electrode 292 may be applied to increase to a predetermined voltage value.

As the voltage is applied to the second electrode 292, the liquid crystal molecules 31 near the second electrode 292 incline in the pretilt direction. The liquid crystal molecules 31 incline substantially parallel to the surface of the first substrate 110 or the second substrate 210.

Figure 17:
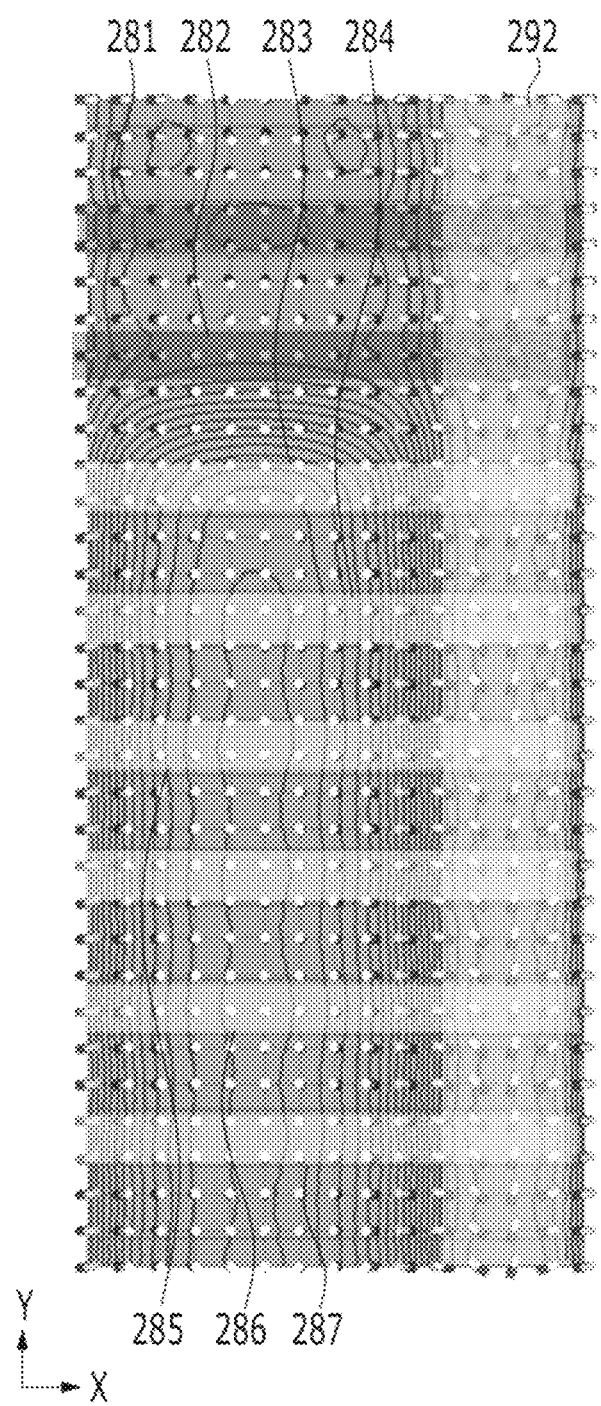
Figure 18:
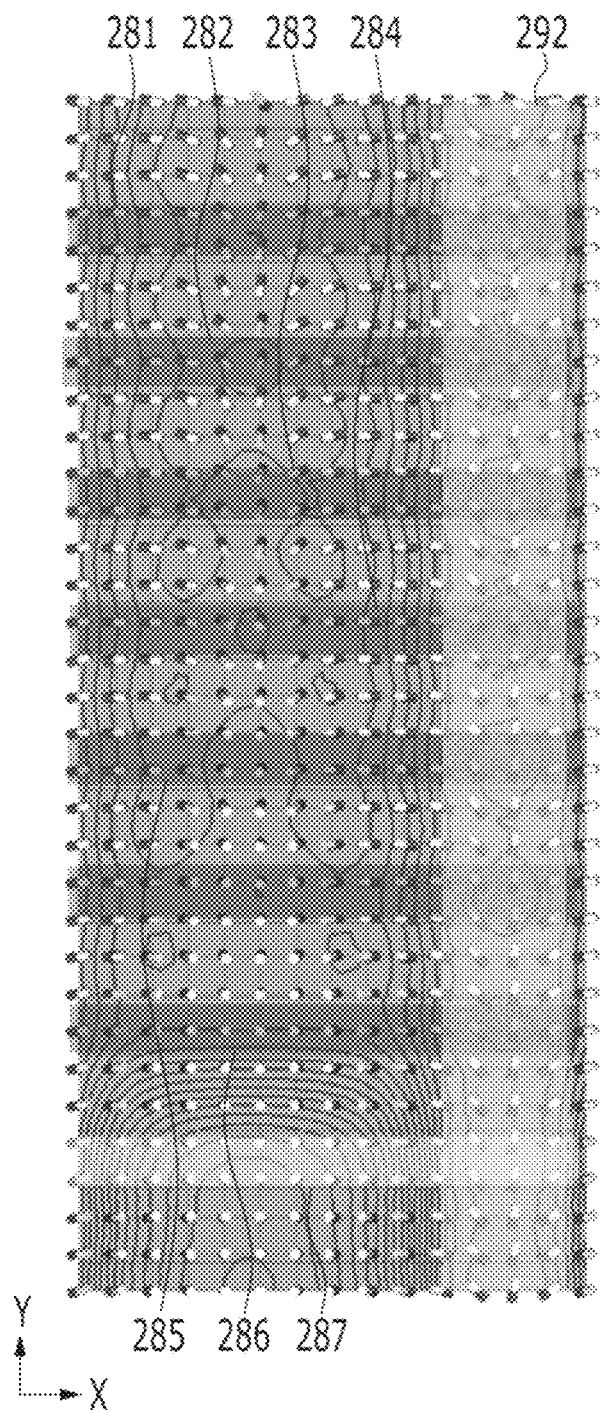

As shown in FIG. 17 and FIG. 18, a voltage is sequentially applied to the first linear electrodes (281-287). FIG. 17 and FIG. 18 illustrate voltages being sequentially applied to the first linear electrodes, from the first linear electrode 281 at the upper portion to the first linear electrode 287 at the lower portion, and the voltage may also be sequentially applied in the same way from the first linear electrode 287 at the lower portion to the first linear electrode 281 at the upper portion, according to the arrangement of the liquid crystal molecules 31 or the polarization of light passing through the phase retardation plate 350.

As shown in FIG. 17, when the voltage is applied to the first electrodes 281 and 282, the liquid crystal molecules 31 near the first electrodes 281 and 282 incline in a direction opposite to the pretilt direction. The voltage is sequentially applied, so the electric field is generated in a direction from the first linear electrodes 281 and 282 to which the voltage is applied to the first linear electrodes (283-287) to which no voltage is applied. The liquid crystal molecules 31 near the right and left regions of the second electrode 292 incline along an equipotential surface in a direction parallel to the x-axis.

Figure 19:
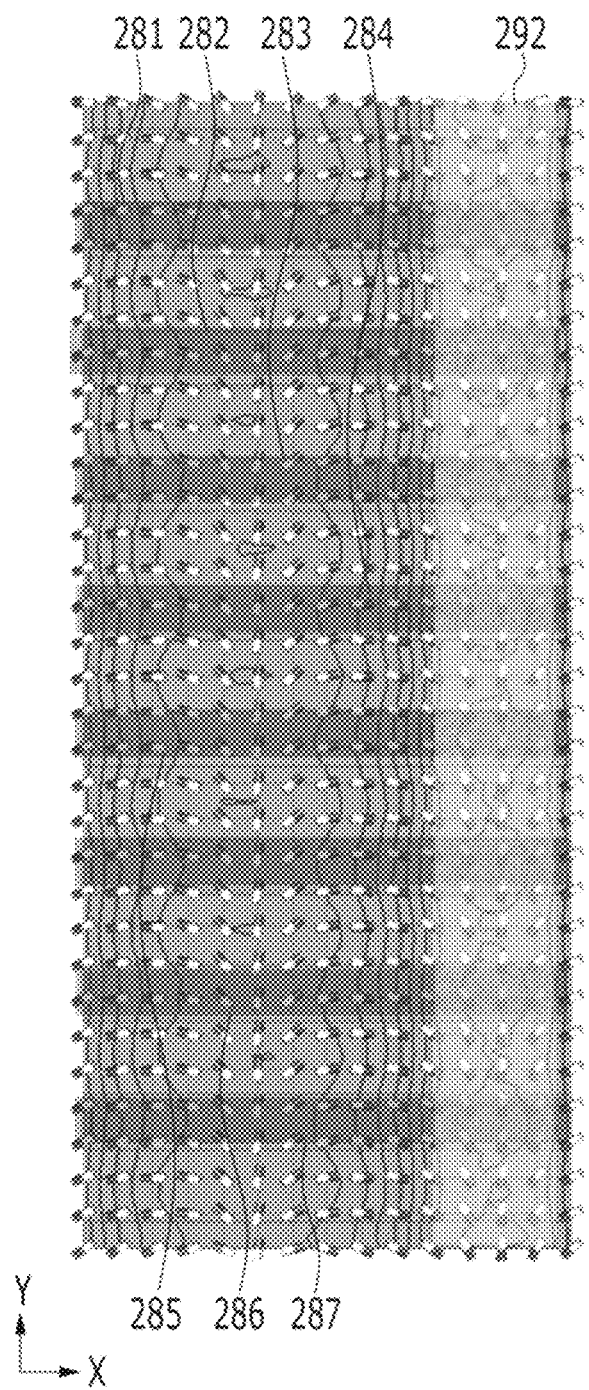

As shown in FIG. 19, the azimuthal angle of the liquid crystal molecules 31 continuously changes in the electric field formed by the voltages applied to the common electrode, the first linear electrode, and the second linear electrode. The liquid crystal molecules 31 form a spiral arrangement, specifically, an n-shaped arrangement.

Phase retardation according to an arrangement of liquid crystal molecules 31 will now be described with reference to FIG. 20.

Figure 20:
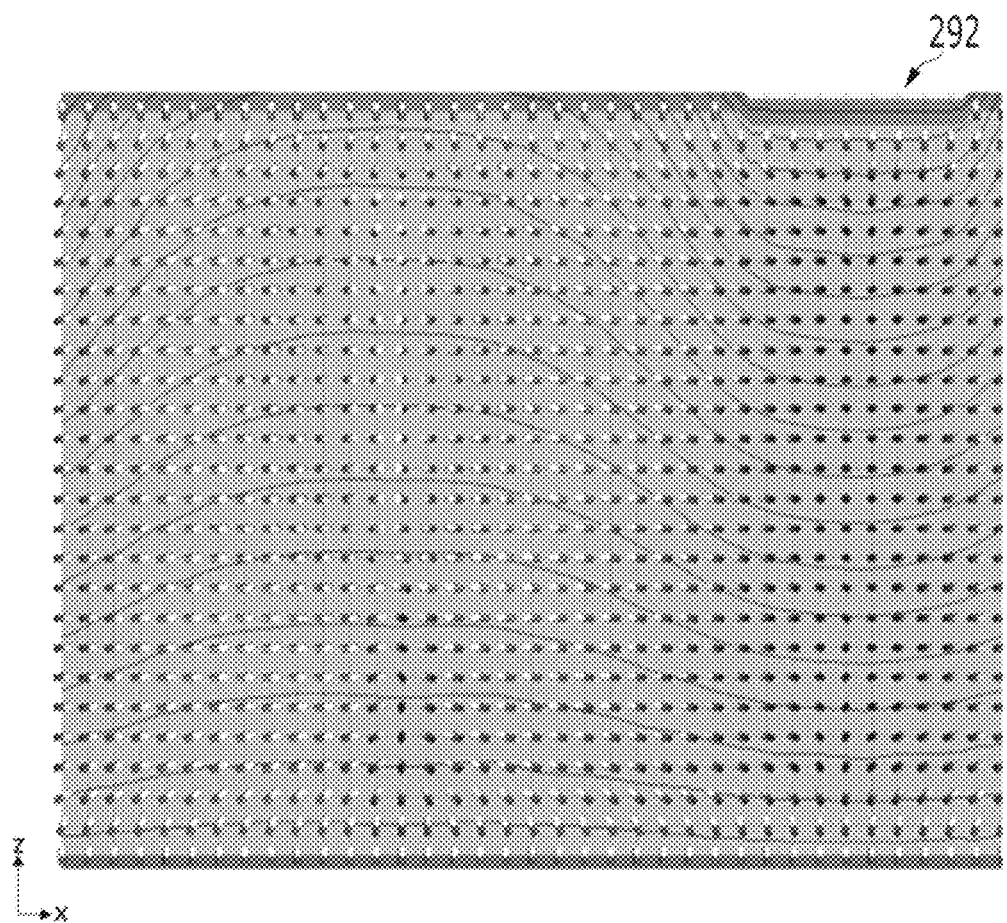
FIG. 20 shows an arrangement on an xz plane of liquid crystal molecules of a liquid crystal layer of an optical modulation device operable in 3D image display mode.

FIG. 20 shows an arrangement on an xz plane of liquid crystal molecules 31 of a liquid crystal layer of an optical modulation device 400 operable in 3D image display mode. The spiral arrangement formed by the liquid crystal molecules 31 may be an n-shaped arrangement.

A unit region may be defined as a region generated when the liquid crystal molecules 31 rotate by 180 degrees in the x-axis direction. A present exemplary embodiment may include two unit regions in a space between the second electrode 291 and the neighboring second electrode 292.

Phase retardation in the liquid crystal layer 3 of the optical modulation device 400 may change in the x-axis direction with respect to incident light. Phase retardation may be changed in the x-axis direction in the optical modulation device 400 by applying voltages to the first electrodes (291-287), the second electrodes 291 and 292, and the common electrode 190.

As described above, when the optical modulation device 400 satisfies Equation 1 and is realized as a half-wave plate, a rotation direction of the received circularly polarized light is reversed. FIG. 20 illustrates the phase change as a function of position in the x-axis direction when left circularly polarized light is input to the optical modulation device 400. The left circularly polarized light then passes through the optical modulation device 400 and changes into right circularly polarized light, and since the phase retardation value of the liquid crystal layer 3 varies in the x-axis direction, the phase of the output circularly polarized light continuously changes.

In general, when the optical axis of the half-wave plate rotates in-plane by $\varphi$, the phase of the output light changes by $2\varphi$, and thus, as shown in FIG. 20, the phase of light output from a single unit in which the azimuthal angle of the long axis of the liquid crystal molecules 31 changes by 180 degrees changes from $2\pi$ (radian) to 0 in the x-axis direction. This is referred to as a backward phase slope.

The phase change may repeat for respective unit regions, and the direction of light may change when the light circularly polarized in a specific direction passes through the optical modulation device 400 having a backward phase slope.

The unit region in which a backward phase slope is formed has been described, and a forward phase slope may be formed in a unit region depending on the initial pretilt angles of the liquid crystal molecules 31. For example, a backward phase slope and a forward phase slope may be formed in one unit element by initializing the pretilt angles of the unit regions having a u-shaped liquid crystal molecules arrangement different from the pretilt angles of the unit regions having an n-shaped liquid crystal molecules arrangement.

In addition, the liquid crystal molecules 31 may be arranged in a u shape by changing the voltage applied to the second electrode after the liquid crystal molecules 31 are arranged in an n shape. For example, at a first stage, the liquid crystal molecules 31 can be arranged in an n shape by applying a predetermined voltage to the second electrode 292 in a unit region. At a second stage, a voltage with a polarity opposite to that of the predetermined voltage is applied to the second electrode 292. At a third stage, a voltage that is greater than the predetermined voltage is applied to the second electrode 292.

The liquid crystal molecules 31 can rearrange according to the electric field generated in the liquid crystal layer 3. Specifically, the liquid crystal molecules 31 will incline substantially parallel to the surface of the first substrate 110 or the second substrate 210 to form an hi-plane arrangement, and the long axis rotates in an in-plane manner to form a spiral arrangement, that is, a u-shaped arrangement.

The azimuthal angle of the long axis of the liquid crystal molecules 31 can vary from 0 (radian) to $2\pi$ (radian). A portion in which the azimuthal angle of the long axis of the liquid crystal molecules 31 varies from 0 (radian) to $2\pi$ (radian) may have a u-shaped arrangement.

An arrangement of stabilized liquid crystal molecules 31 of the optical modulation device 400 will now be described with reference to FIG. 21.

Figure 21:
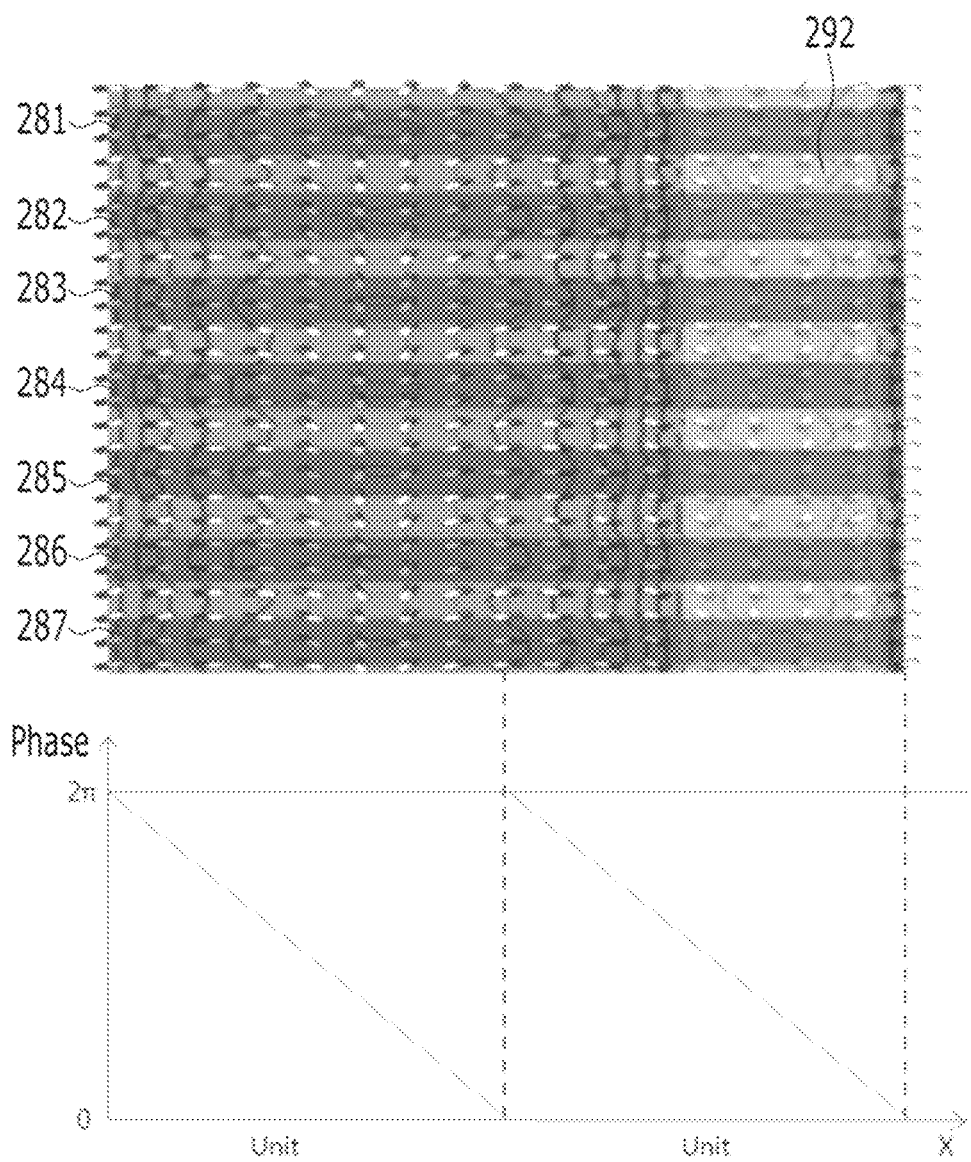
FIG. 21 shows an arrangement on an xz plane of liquid crystal molecules of a liquid crystal layer of an optical modulation device operable in 3D image display mode.

FIG. 21 shows an arrangement in an xz plane of liquid crystal molecules 31 of a liquid crystal layer of an optical modulation device 400 operable in 3D image display mode. An in-plane arrangement direction of the liquid crystal molecules 31 corresponding to the second electrode 291 is opposite to the in-plane arrangement direction of the liquid crystal molecules 31 corresponding to the second electrode 292, and the liquid crystal molecules 31 corresponding to the space between the second electrode 291 and the second electrode 292 continuously rotates in the x-axis direction to form a spiral arrangement.

Figure 22:
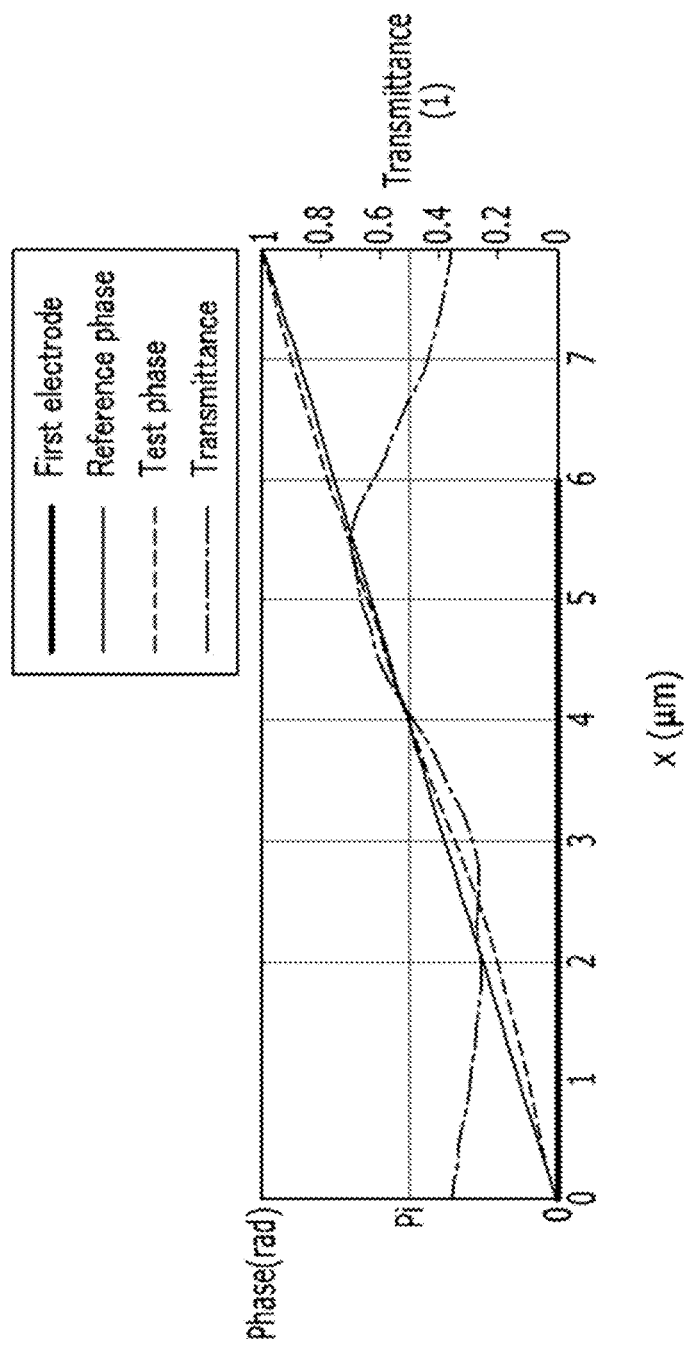
FIG. 22 and FIG. 23 show graphs of a phase and a phase error of an optical modulation device according to an exemplary embodiment.
Figure 23:
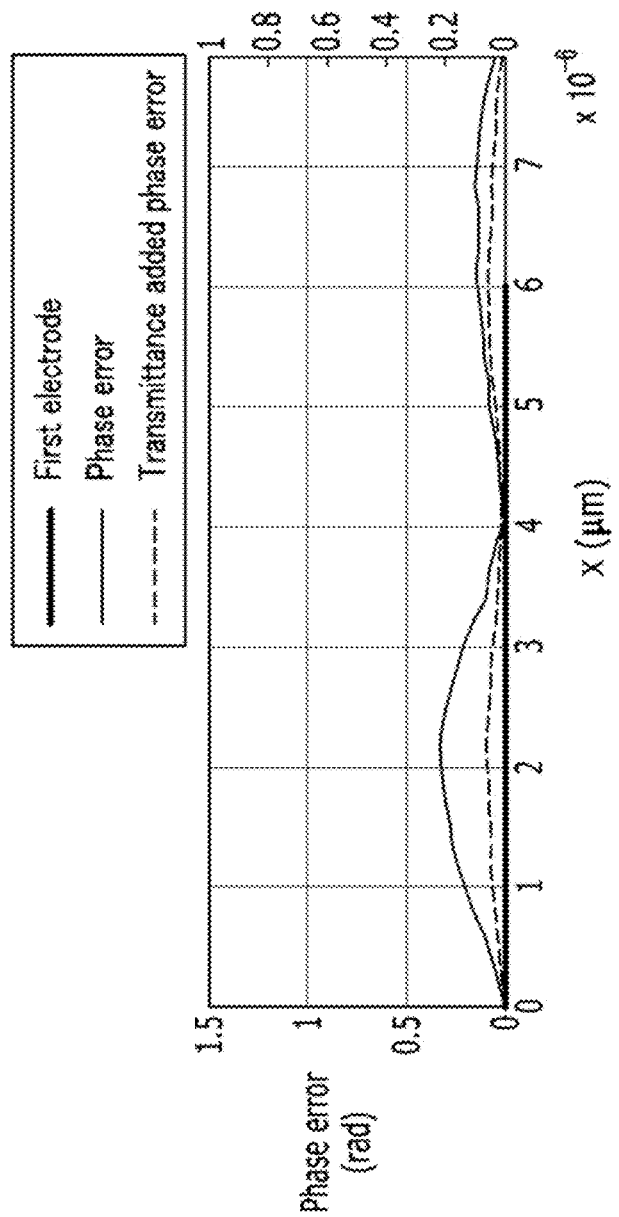

FIG. 22 and FIG. 23 show graphs of a phase and a phase error of an optical modulation device 400 according to an exemplary embodiment. FIG. 22 shows a simulation graph of a phase change and transmittance according to a position of propagated light when left circularly polarized light is received by the optical modulation device 400 that includes liquid crystal molecules 31 that are driven by the above-described driving signal and arranged as shown in FIG. 20. As shown in FIG. 22, the simulated phase change has a form similar to a reference phase change.

On the other hand, when right circularly polarized light passes through the optical modulation device 400 that includes liquid crystal molecules 31 driven by the above-described driving signal and arranged as shown in FIG. 20, the light phase changes from $2\pi$ (radian) to 0 in the x-axis direction. This is called a backward phase slope. The phase change may repeat for respective unit regions, and a backward phase slope portion of a lens may be realized that can change the direction of light by using the optical modulation device 400. Further, transmittance of light passing through the optical modulation device 400 changes according to the arrangement of the liquid crystal molecules 31.

As shown in FIG. 23, a phase error is given within 0.5 rad, and when transmittance is added, the phase change of the optical modulation device 400 according to an exemplary embodiment has a value very close to the reference phase change.

Embodiments of the present disclosure may be implemented as a code in a computer readable medium in which a program is recorded. The computer readable medium may include all kinds of recording apparatuses in which computer-readable data may be stored. An example of a computer readable medium includes a hard disk drive (HDD), a solid state disk (SSD), a silicon disk drive (SDD), a read only memory (ROM), a random access memory (RAM), a compact disk read only memory (CD-ROM), magnetic tape, a floppy disk, an optical data storage, etc. The computer may also include a controller of a terminal. Therefore, the above detailed description is not to be interpreted as being restrictive, but is to be considered as being illustrative. The scope is to be determined by a reasonable interpretation of the claims, and all alternatives within equivalents fall within the scope.

What is claimed is:

1. An optical modulation device, comprising:
   a display panel that includes a polarizer for linearly polarizing light of an image displayed to the display panel;

a phase retardation plate disposed on the display panel;
a first substrate and a second substrate that face each other; and
a liquid crystal layer provided between the first substrate and the second substrate and that includes a plurality of liquid crystal molecules,
wherein the first substrate includes a plurality of unit regions, a common electrode and a first aligner, and
the second substrate includes a plurality of unit regions, a plurality of upper-plate electrodes that include a plurality of first electrodes extending in a first direction and a plurality of second electrodes extending in a second direction crossing the first direction, and a second aligner,
wherein the optical modulation device is disposed on the phase retardation plate.

2. The optical modulation device of claim 1, wherein the plurality of liquid crystal molecules are substantially perpendicular to a surface direction of the common electrode or the upper-plate electrode.

3. The optical modulation device of claim 2, wherein when the optical modulation device is turned on, a voltage is applied to the common electrode and the second electrodes.

4. The optical modulation device of claim 3, wherein after the voltage is applied to the common electrode and the second electrodes, a voltage is sequentially applied to the first electrodes in a direction in which the first electrodes are arranged.

5. The optical modulation device of claim 4, wherein an increasing voltage is applied to the first electrodes and the second electrodes.

6. The optical modulation device of claim 5, wherein when the voltage is applied to the common electrode and the upper-plate electrode, the liquid crystal molecules rotate 180 degrees in the first direction between two second electrodes of two neighboring unit regions.

7. The optical modulation device of claim 6, wherein the unit region forms one of a forward phase slope or a backward phase slope.

8. The optical modulation device of claim 7, wherein gaps between the second electrodes are different and correspond to an inclination of the phase slope of a corresponding unit region.

9. The optical modulation device of claim 4, wherein a polarity of the voltage applied to the common electrode differs from a polarity of the voltage applied to the upper-plate electrode.

10. An optical modulation device comprising:
a display panel that includes a polarizer for linearly polarizing light of an image displayed to the display panel:
a phase retardation plate disposed on the display panel;
a first substrate that includes a common electrode;
a second substrate that includes a plurality of unit regions and a plurality of upper-plate electrodes; and
a liquid crystal layer disposed between the first substrate and the second substrate that includes a plurality of liquid crystal molecules,
wherein the plurality of upper-plate electrodes include a plurality of first electrodes extending in a first direction and a plurality of second electrodes extending in a second direction crossing the first direction, and
when a voltage is applied to the common electrode and the upper-plate electrodes, the liquid crystal molecules rotate 180 degrees in the first direction and between two second electrodes of two neighboring unit regions,
wherein the optical modulation device is disposed on the phase retardation plate.

11. The optical modulation device of claim 10, wherein the first substrate further includes a first aligner and the second substrate further includes a second aligner, and the plurality of liquid crystal molecules are initially substantially perpendicular to a surface direction of the common electrode or the upper-plate electrodes.

12. The optical modulation device of claim 10, wherein when the optical modulation device is turned on, a voltage is applied to the common electrode and the second electrodes, a voltage is sequentially applied to the first electrodes in a direction in which the first electrodes are arranged, wherein the voltage applied to the first electrodes and the second electrodes increases stepwise.

* * * * *